United States Patent [19]

Adee

[11] 4,173,262
[45] Nov. 6, 1979

[54] DISC GANG MOUNTING

[75] Inventor: Raymond A. Adee, Newton, Kans.

[73] Assignee: Hesston Corporation, Hesston, Kans.

[21] Appl. No.: 854,887

[22] Filed: Nov. 25, 1977

[51] Int. Cl.$^2$ .................... A01B 23/00; A01B 71/04
[52] U.S. Cl. .................................. 172/599; 308/19;
308/181
[58] Field of Search ............ 172/599, 600; 308/181,
308/19

[56] References Cited

U.S. PATENT DOCUMENTS

| | | | |
|---|---|---|---|
| 2,566,991 | 9/1951 | McKay | 308/181 |
| 2,725,812 | 12/1955 | Frank | 308/181 |
| 2,729,043 | 1/1956 | Frank | 172/599 |
| 2,733,648 | 2/1956 | Todd | 172/599 |

Primary Examiner—Richard J. Johnson
Attorney, Agent, or Firm—Schmidt, Johnson, Hovey & Williams

[57] ABSTRACT

The depending struts on a tool beam have "floating" bearings at their lowermost ends which can be displaced in a horizontal direction generally parallel to the beam between relatively closely spaced, fixed limits. The bearings in turn journal a disc gang assembly for rotation of the latter during ground engagement, yet the bearings are secured against axial displacement relative to the assembly so that the assembly and the bearings can move together through said displacement between the fixed limits. Adjustment of the struts along the beam during installation until they are positioned between such limits so as to permit displacement in either direction thereby avoids axial pre-loading of the bearings.

12 Claims, 5 Drawing Figures

DISC GANG MOUNTING

This invention relates to tillage tools, and has as one important object thereof to provide a way of mounting a disc gang assembly onto a tool beam without axially preloading the bearings associated with the assembly.

Bearing failure in disc implements is a common occurrence. Such bearings are naturally subjected to substantial loadings in an axial direction relative to the line of discs because the oblique orientation of the discs with respect to the path of travel of the implement causes part of the reactionary force during ground engagement to be directed axially along the gang rather than solely in a perpendicular direction as might be true if the discs were parallel to the path of travel. This thrust or axial loading is frequently borne by only one of the several bearings that support the gang, or at least it often occurs that one of the bearings will receive a disproportionate share of the loading. While most bearings in use today can withstand this type of loading, when coupled with additional pre-loading derived by faulty installation, the stress may simply be too great and the bearings will fail.

In a conventional arrangement, the bearings for the gang are fixed to the struts against movement. Thus, when the gang is assembled and the bearings are secured in place along the shaft with the other components of the gang, the fixed distance between bearings becomes the determining factor as to the distance between the struts. In other words, when the gang assembly is then attached to the struts, the struts are adjusted, bent, stressed or otherwise conformed to the distance between the bearings because only in that way can the bearings then be attached to the struts. Tolerance problems and the haste with which such assemblies are frequently installed contribute to the likelihood that pre-loading will arise. Moreover, it is extremely difficult to detect when the bearings have been axially pre-loaded until after the damage has been done and the bearings have failed.

Accordingly, another important object of this invention is to attach the bearings to the struts in such a way that the gang assembly can have a limited amount of free-floating axial displacement between relatively closely spaced limits, thereby assuring that the bearings are not pre-loaded axially during installation or reassembly.

A further important object of this invention is to achieve the foregoing objects without unduly complicating the task of installing the assembly and to provide a way in which the installation can be visually checked against axial pre-loading of the bearings. In the drawing.

Figure 1:
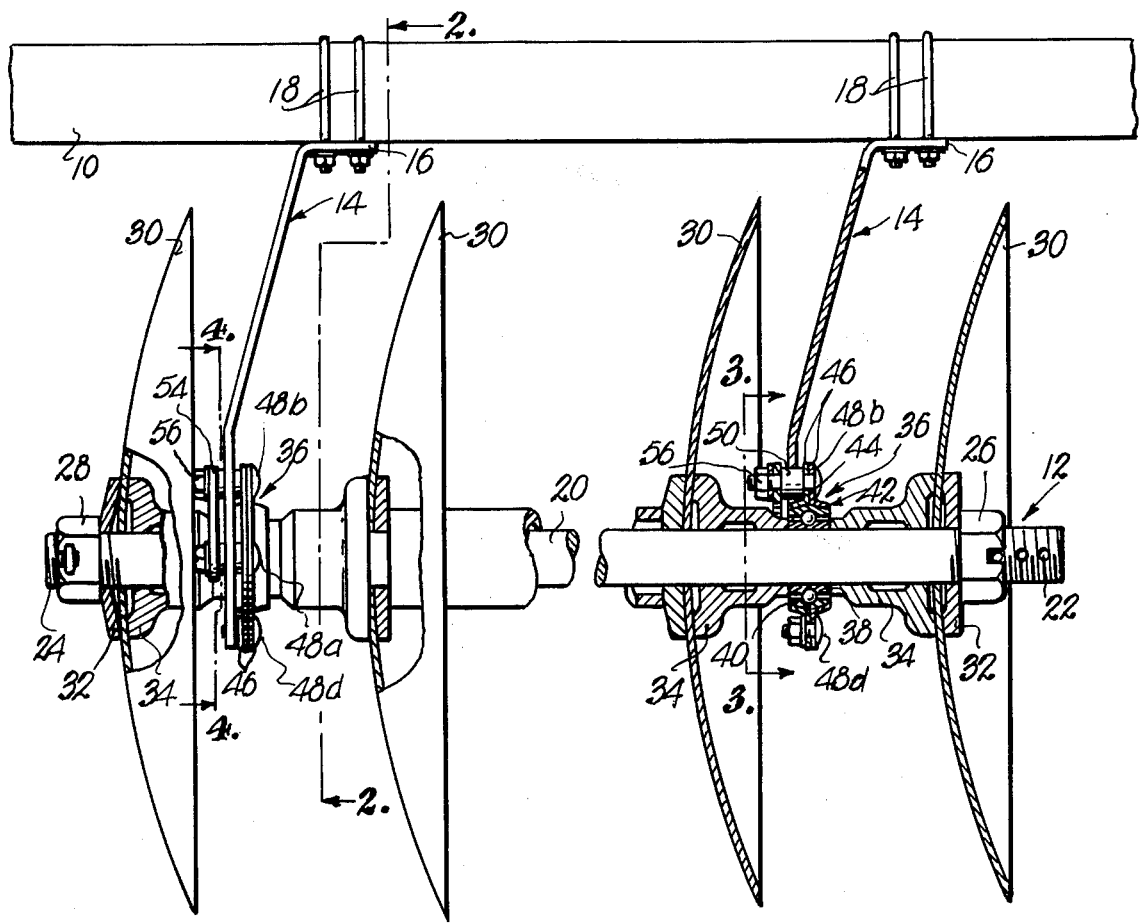
FIG. 1 is a fragmentary, elevational view of a tillage implement utilizing the disc gang mounting arrangement pursuant to the principles of the present invention, parts being shown in cross section and broken away for clarity.
Figure 2:
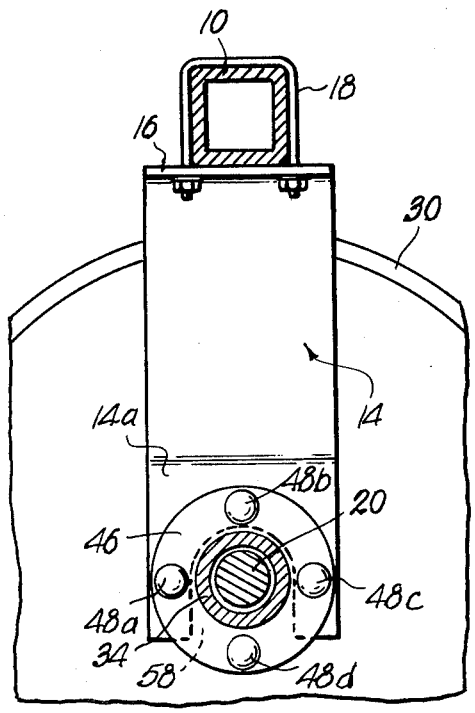
FIG. 2 is a fragmentary, vertical cross-sectional view through the implement taken substantially along line 2—2 of FIG. 1.
Figure 5:
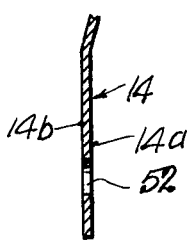
Figure 3:
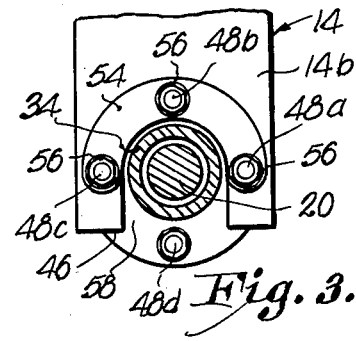
FIG. 3 is a fragmentary, vertical cross-sectional view through the gang assembly and associated mounting strut taken along line 3—3 of FIG. 1.
Figure 4:
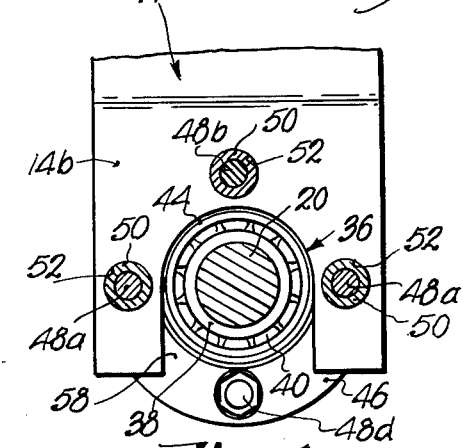

FIG. 4 is a fragmentary, slightly enlarged vertical cross-sectional view taken along line 4—4 of FIG. 1; and FIG. 5 is a fragmentary, vertical cross-sectional view through one of the depending struts illustrating the opening that permits axial flotation of the associated bearing. The elongated tool beam 10 carries disc gang assembly 12 by at least two depending struts 14 which are identical in configuration and function to one another. Each of the depending struts 14 has an uppermost, inturned flange 16 that extends parallel to the flat bottom of the beam 10 and is clamped against the latter by a pair of releasable U-bolts 18.

The gang assembly 12 includes a shaft 20 threaded at its opposite ends 22 and 24 to receive nuts 26 and 28, respectively. A series of ground-engaging discs 30 are spaced along the shaft 20 and are secured to the latter for rotation therewith by the clamping action of the opposed nuts 26, 28 against various washer-like components 32 and spools 34 that occupy the space between adjacent ones of the discs 30.

Also clamped in place along the shaft 20 are at least two bearings 36, the inner races 38 of which are clamped between the proximal ends of a pair of the spools 34. On the other hand, the outer races 40 of the bearings 36 are secured to the corresponding struts 14.

Each of the bearings 36 includes a two-part casing 42 that houses the inner and outer races 38, 40, such opposite halves of the casing 42 presenting radially outwardly converging hubs 44 that project a short distance in opposite directions along the shaft 20 and back-to-back lips 46 that project radially outwardly from the hubs 44. The lips 46 are perforated at four places around the circumference thereof so as to receive four fastening bolts 48, three of which secure the bearings 36 to the struts 14.

The top three fastening bolts 48a, 48b and 48c associated with each bearing 36 pass through respective tubular spacers 50 that are in turn slidably received within corresponding transverse openings 52 in the struts 14. The bolts 48a, 48b and 48c extend beyond the spacers 50 to carry a semiannular piece 54 that is held against the distal ends of the spacers 50 by nuts 56 on the bolts 48a, 48b and 48c. The spacers 50 are thus clamped between the semiannular piece 54 on the one hand, and the lips 46 on the opposite hand.

Each of the struts 14 is provided at its lower end with an inverted, generally U-shaped aperture 58 that is surrounded by respective surface areas 14a and 14b on opposite sides of the struts 14. Each aperture 58 is sized to permit entry of the hub 44 of the corresponding bearing 36 when the lips 46 of the latter are engaged with the surface 14a, thereby avoiding interference between the struts 14 and the hubs 44 during axial displacement of the assembly 12 as now explained.

The lips 46 and the semiannular piece 54 are intended to and do serve as opposite limiting shoulders that establish the extent of axial flotation allowed the gang assembly 12. To this end, during installation the assembly 12, with the bearings 36 clamped in place along the shaft 20, is presented to the struts 14 for attachment to the beam 10. The bolt 48d of each bearing 36 may be in place at this time since it serves only to hold the two opposite halves of the casing 42 together, but the three bolts 48a, 48b and 48c of the bearings 36 are not yet in place. Once the assembly 12 has been inserted up into the apertures 58 of struts 14 so that hubs 44 of the bearings 36 extend into the apertures 58, then the bolts 48a, 48b and 48c, along with the spacers 50, the semiannular piece 54 and the nuts 56, may be installed. Once the nuts 56 are tightened down, it is then necessary to establish that the struts 14 are not stressed against either of the opposed shoulders defined by the lips 46 and the semiannular piece 54, this being best assured by locating the struts 14 so that they fall approximately midway along the spacers 50, out of engagement with either of the semiannular piece 54 and the lips 46.

Adjustment of the struts 14 is, of course, readily obtained by simply loosening the U-bolts 18 to the extent necessary and sliding the struts 14 along the beam 10 in the required direction. Retightening of the bolts 18 will secure the struts 14 in their selected positions, and a quick visual check of the location of the struts 14 along the spacers 50 will provide an indication of whether or not the bearings 36 are axially pre-loaded.

Note that by centering the struts 14 along the spacers 50, when the gang assembly 12 is engaged with the ground and the implement is advanced, side thrust will cause either the lips 46 or the semiannular pieces 54 to engage their corresponding strut surfaces 14a or 14b, depending upon the direction of thrust. Such thrust or axial loading, however, will be shared by the bearings 36 to the end that premature failure thereof will be substantially avoided, if not eliminated.

Having thus described the invention, what is claimed as new and desired to be secured by Letters Patent is:

1. A disc gang mounting comprising:
   an elongated beam;
   a pair of longitudinally spaced struts depending from said beam;
   a gang assembly supported by said struts beneath the beam and including a shaft extending generally parallel to the latter,
   said assembly further including a plurality of ground-working discs fixed to said shaft and spaced along the latter; and
   means journaling said assembly for rotation about the longitudinal axis of the shaft and attaching the assembly to said struts for free axial displacement of the assembly between a pair of spaced, predetermined limits,
   said means including a pair of bearings for the shaft and displaceable with said assembly, said limits including a pair of shoulders attached to each of said bearings, respectively, on opposite sides of the corresponding struts,
   each of said struts being provided with a clearance aperture therethrough for said shaft and with a surface adjacent said aperture, one shoulder of each bearing including a peripheral lip extending radially outwardly beyond said aperture into overlapping relationship with said surface.

2. A disc gang mounting as claimed in claim 1, wherein said lip is continuous.

3. A disc gang mounting as claimed in claim 1, wherein each of said bearings includes a hub disposed radially inwardly from said lip and projecting transversely of the lip along the shaft, said hub being disposed to enter said aperture when the lip is engaged with said surface of the strut.

4. A disc gang mounting as claimed in claim 3, wherein each strut is further provided with at least one guide opening in radial registration with said lip, said lip and the other of said shoulders being separated by a spacer extending parallel to said shaft and axially shiftable within said opening during said displacement.

5. A disc gang mounting as claimed in claim 4, wherein each of said spacers is tubular, receiving an elongated fastener that clamps the spacer between said lip and the other shoulder.

6. A disc gang mounting as claimed in claim 5, wherein is provided a plurality of said spacers, fasteners and openings arranged in circumferentially spaced relationship to one another, said strut having an opposite surface disposed for limiting engagement with said other shoulder, said other shoulder including an at least substantially semiannular piece interconnecting the plurality of spacers and fasteners.

7. A disc gang mounting as claimed in claim 5, wherein at least one of said struts is provided with means adjustably securing the one strut to the beam for selective positioning of the one strut along the beam.

8. A disc gang mounting comprising:
   a support;
   an elongated disc gang assembly including a pair of bearings spaced a certain longitudinal distance apart;
   a pair of mounting members for the assembly;
   means fastening said members to the support,
   said fastening means being selectively adjustable to permit adjustment of the position of said members along said support according to said certain distance between said pair of bearings; and
   means attaching said assembly to said members for free axial displacement of the assembly relative to said members between a pair of spaced, predetermined limits.

9. A disc gang mounting as claimed in claim 8, wherein said members are each provided with a clearance aperture therein, said attaching means including longitudinally extending fasteners through said members and holding said assembly with its longitudinal axis extending through said apertures, said attaching means further including a pair of limit shoulders at opposite ends of said fasteners in disposition for abutting engagement with opposite sides of the members after a certain amount of free axial displacement of the assembly.

10. A disc gang mounting as claimed in claim 8, wherein said limits include structure cooperating with at least one of said members, said structure including a pair of spaced-apart, opposed shoulders on opposite sides of said one member and movable with said assembly during said displacement.

11. A disc gang mounting as claimed in claim 10, wherein said one member is provided with a transverse opening therethrough, said shoulders having a spacer therebetween that is shiftably received by said opening for guiding said assembly during said displacement.

12. A disc gang mounting as claimed in claim 7, wherein the other of said members is provided with a transverse second opening therethrough, said attaching means including a guide element displaceable with said assembly and shiftably received within said opening.

* * * * *